United States Patent

Dunn et al.

[11] Patent Number: 5,542,503
[45] Date of Patent: Aug. 6, 1996

[54] ROTOR FOR DISC BRAKE ASSEMBLY

[75] Inventors: Michael E. Dunn, Canton; Don Varnelis, Belleville, both of Mich.

[73] Assignee: Kelsey-Hayes Company, Romulus, Mich.

[21] Appl. No.: 479,903

[22] Filed: Jun. 6, 1995

[51] Int. Cl.$^6$ ............................................... F16D 55/02
[52] U.S. Cl. ................................. 188/18 A; 188/218 XL
[58] Field of Search .......................... 188/18 A, 218 XL, 188/264 A, 264 AA, 26, 71.6, 58; 192/113.2, 113.23

[56] References Cited

U.S. PATENT DOCUMENTS

| | | | |
|---|---|---|---|
| 3,899,054 | 8/1975 | Huntress et al. | 188/318 XL |
| 4,164,993 | 8/1979 | Kobelt | 188/264 AA |
| 4,865,167 | 9/1989 | Giorgetti et al. | |
| 4,928,798 | 5/1990 | Watson et al. | |
| 5,004,078 | 4/1991 | Oono et al. | 188/218 XL |
| 5,188,203 | 2/1993 | Winter | |
| 5,429,214 | 7/1995 | Weibelhaus et al. | 188/218 XL |

FOREIGN PATENT DOCUMENTS

| | | |
|---|---|---|
| 0077433 | 4/1983 | European Pat. Off. |
| 3527577 | 2/1987 | Germany |
| 4210448 | 10/1993 | Germany |
| 4210449 | 10/1993 | Germany |

*Primary Examiner*—Lee Young
*Attorney, Agent, or Firm*—MacMillan, Sobanski & Todd

[57] ABSTRACT

A rotor adapted for use in a vehicle disc brake assembly includes an inner annular mounting flange portion defining a rotational axis and an outer annular disc portion. The outer annular disc portion includes a pair of friction plates which are connected together in spaced apart relationship by a plurality of posts located about the circumference of the rotor. The plurality of posts are divided into a plurality of groups of four posts. Each group of four posts includes a first post and a second post which are radially aligned with one another along with respect to a first bisecting radius extending outwardly from the rotational axis of the rotor. Each group of four posts also includes a third post and a fourth post which are radially aligned with one another with respect to a second bisecting radius extending outwardly from the rotational axis of the rotor. The first common bisecting radius and the second common bisecting radius are disposed at a predetermined angle relative to one another. The first, second, and third posts are formed having a tear-drop cross sectional shape, while the fourth post is formed having a circular cross sectional shape.

37 Claims, 4 Drawing Sheets

ROTOR FOR DISC BRAKE ASSEMBLY

BACKGROUND OF THE INVENTION

This invention relates in general to vehicle disc brake assemblies and in particular to an improved structure for a rotor adapted for use in such a vehicle disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. A caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from opposed axial sides or braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

A considerable amount of heat is generated between the rotor and the brake shoes during braking. In order for a rotor to be able to adequately absorb the heat generated during a given stop, as well as to sufficiently cool to a safe operating temperature for the next stop, it is known to form the rotor having a "vented" or "ventilated" design. A conventional ventilated rotor includes a pair of spaced apart brake friction plates which are connected together by a plurality of ribs or posts. U.S. Pat. No. 5,188,203 to Winter, U.S. Pat. No. 4,928,798 to Watson et al., U.S. Pat. No. 4,865,167 to Giorgetti et al., German No. 4,210,449, German Patent No. 4,210,448, German Patent No. 3,527,577, and European Patent No. 77,433 disclose prior art ventilated brake rotors.

In a ventilated rotor, the particular shapes and spacings of the ribs or posts is important for several reasons. First, the shapes and spacings of the ribs or posts should not restrict the flow of cooling air through interior passageways defined therebetween. At the same time, the shapes and spacings of the ribs or posts should provide the rotor with sufficient strength or rigidity. This is especially important at the outer radial portion of the rotor, inasmuch as the brake pads generally apply a greater braking pressure in this region. Additionally, the shape and spacing of the ribs or posts should not add unnecessary rotating mass and unsprung weight to the vehicle, which adversely affects the performance, handling, and fuel economy of the vehicle. Thus, it would be desirable to provide an improved structure for a ventilated rotor adapted for use in a disc brake assembly which provides satisfactory heat capacity and rigidity.

SUMMARY OF THE INVENTION

This invention relates to an improved structure for a rotor adapted for use in a vehicle disc brake assembly. The rotor includes an inner annular mounting flange portion defining a rotational axis and an outer annular disc portion. The outer annular disc portion includes a pair of friction plates which are connected together in spaced apart relationship by a plurality of posts located about the circumference of the rotor. The plurality of posts are divided into a plurality of groups of four posts. Each group of four posts includes a first post and a second post which are radially aligned with one another along with respect to a first bisecting radius extending outwardly from the rotational axis of the rotor. Each group of four posts also includes a third post and a fourth post which are radially aligned with one another with respect to a second bisecting radius extending outwardly from the rotational axis of the rotor. The first common bisecting radius and the second common bisecting radius are disposed at a predetermined angle relative to one another. The first, second, and third posts are formed having a tear-drop cross sectional shape, while the fourth post is formed having a circular cross sectional shape.

Various objects and advantages of this invention will become apparent to those skilled in the an from the following detailed description of the preferred embodiment, when read in light of the accompanying drawings.

DETAILED DESCRIPTION OF THE PREFERRED EMBODIMENT

Figure 1:
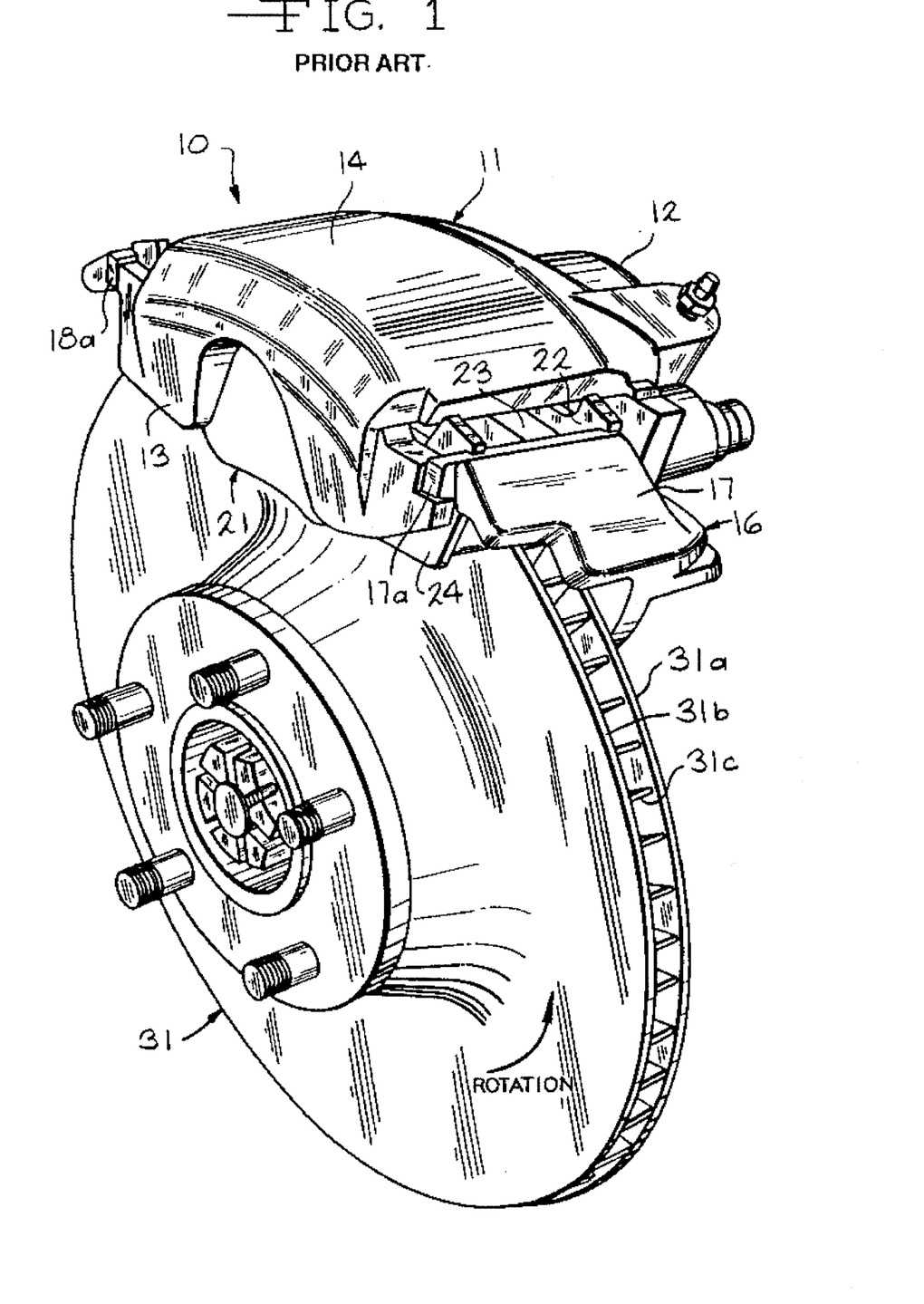
FIG. 1 is a perspective view of a portion of a prior art vehicle disc brake assembly.
Figure 2:
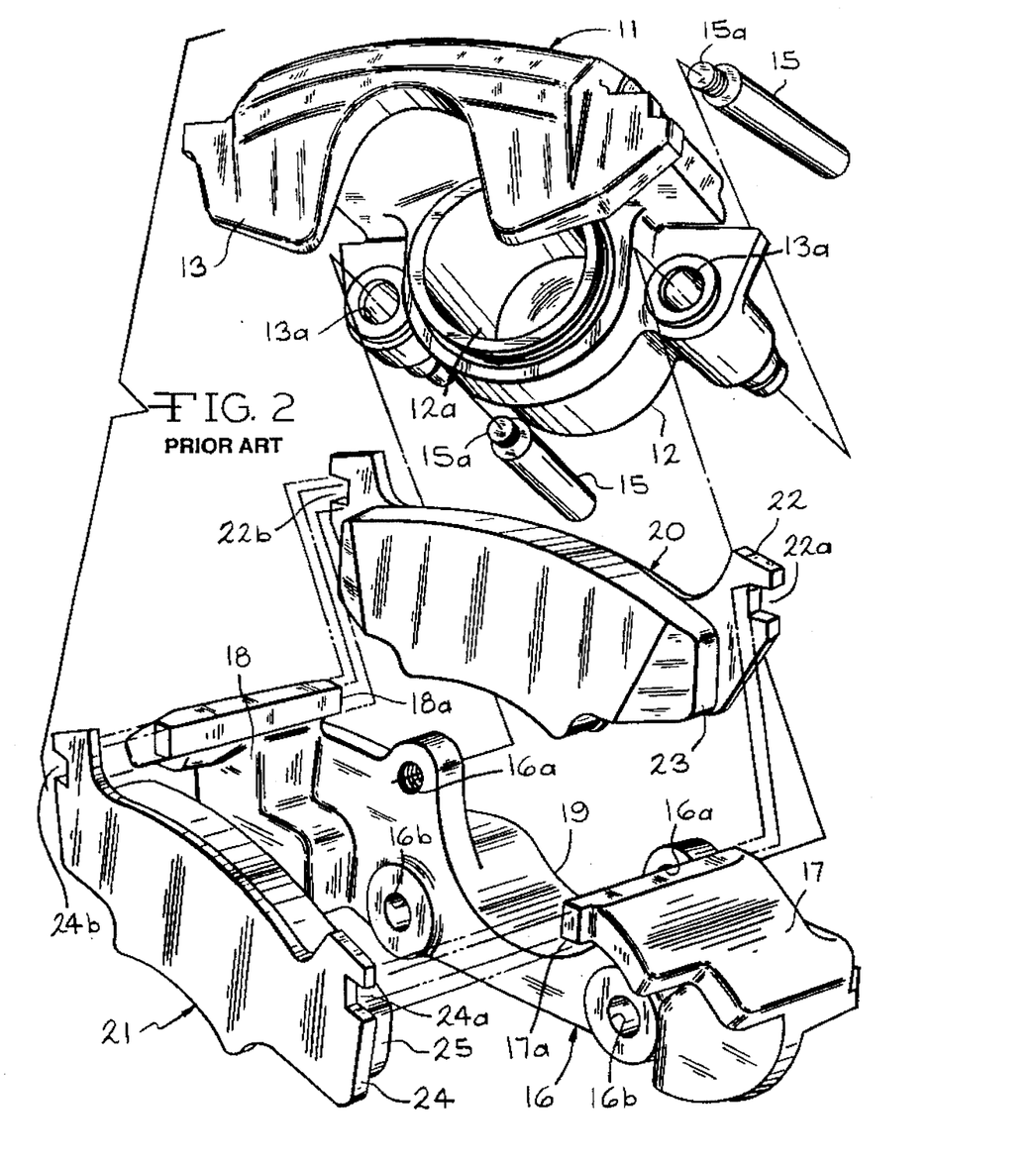
FIG. 2 is an exploded perspective view of selected components of the prior art vehicle disc brake assembly illustrated in FIG. 1.
Figure 3:
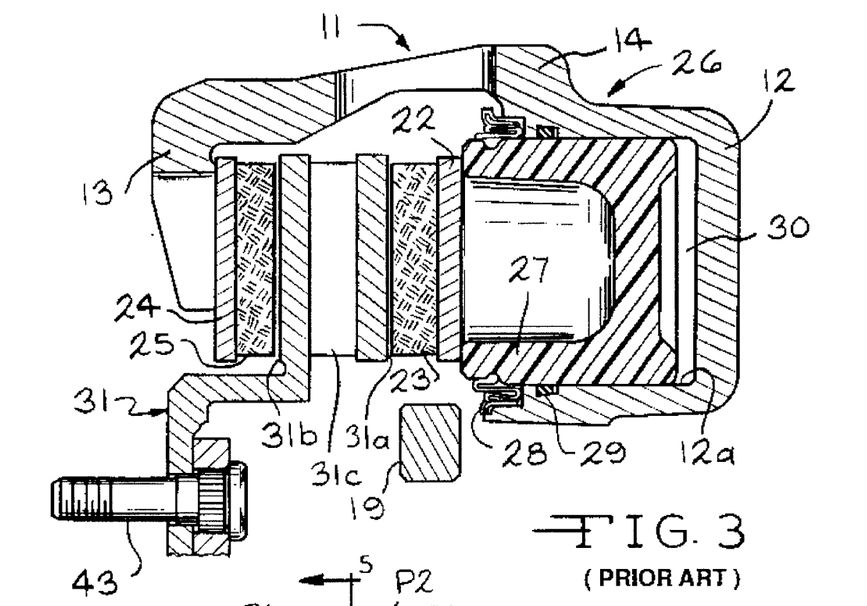
FIG. 3 is a sectional elevational view of a portion of the prior art disc brake assembly illustrated in FIG. 1.

Referring now to the drawings, there is illustrated in FIGS. 1 through 3 a portion of a prior art vehicle disc brake assembly, indicated generally at 10. The general structure and operation of the disc brake assembly 10 is conventional in the art. Thus, only those portions of the disc brake assembly 10 which are necessary for a full understanding of this invention will be explained and illustrated.

The disc brake assembly 10 includes a generally C-shaped caliper, indicated generally at 11. The caliper 11 includes an inboard leg portion 12 and an outboard leg portion 13 which are interconnected by an intermediate bridge portion 14. The caliper 11 is slidably supported on a pair of pins 15 secured to an anchor plate, indicated generally at 16. The pins 15 extend through respective non-threaded apertures 13a formed through the inboard leg portion 13 of the caliper 11. The pins 15 have threaded ends 15a which are received in threaded apertures 16a formed through the anchor plate 16. The pins 15 permit the caliper 11 to slide in both the outboard direction (toward the left when viewing FIG. 3) and the inboard direction (toward the right when viewing FIG. 3 ). Such sliding movement of the caliper 11 occurs when the disc brake assembly 10 is actuated, as will be explained below. A pair of bolts (not shown) extend through a pair of non-threaded apertures 16b formed through the anchor plate 16 to secure the anchor plate 16 to a stationary component of the vehicle, such as the steering knuckle (not shown) in a front wheel drive vehicle.

As best shown in FIG. 2, the illustrated anchor plate 16 includes a pair of outwardly extending arms 17 and 18 which are interconnected by an inner tie bar 19. The arms 17 and 18 have respective upstanding guide rails 17a and 18a, respectively formed thereon. The guide rails 17a and 18a extend transverse to the arms 17 and 18 and parallel to one another. The guide rails 17a and 18a are provided to slidably support an inboard brake shoe, indicated generally at 20, and an outboard brake shoe, indicated generally at 21.

The inboard brake shoe 20 includes a backing plate 22 and a friction pad 23. The inboard backing plate 22 has notches 22a and 22b formed in the opposed ends thereof for slidably supporting the inboard brake shoe 20 on the guide rails 17a and 18a of the anchor plate 16. The outboard brake shoe 21 includes a backing plate 24 and a friction pad 25. The outboard backing plate 24 has notches 24a and 24b formed in the opposed ends thereof for slidably supporting the outboard brake shoe 21 on the guide rails 17a and 18a of the anchor plate 16. Alternatively, as is known in the art, the inboard brake shoe 20 can be supported on a brake piston (not shown), while the outboard brake shoe 21 can be supported on the outboard leg portion 13 of the caliper 11 (not shown).

An actuation means, indicated generally at 26, is provided for effecting the operation of the disc brake assembly 10. The actuation means 26 includes a piston 27 which is disposed in a counterbore or recess 12a formed in the outboard surface of the inboard leg 12 of the caliper 11. The actuation means 26, shown in this embodiment as being a hydraulic actuation means, is operable to move the piston 27 in the outboard direction within the recess 12a (left when viewing FIG. 3). However, other types of actuation means 26, such as electrical and mechanical types, can be used.

The disc brake assembly 10 also includes a dust boot seal 28 and an annular fluid seal 29. The dust boot seal 28 is formed from a flexible material and has a first end which engages an outboard end of the recess 12a. A second end of the dust boot seal 28 engages an annular groove formed in an outer side wall of the piston 26. A plurality of flexible convolutions are provided in the dust boot seal 28 between the first and second ends thereof. The dust boot seal 28 is provided to prevent water, dirt, and other contaminants from entering into the recess 12a. The fluid seal 29 is disposed in an annular groove formed in a side wall of the recess 12a and engages the outer side wall of the piston 26. The fluid seal 29 is provided to define a sealed hydraulic actuator chamber 30, within which the piston 27 is disposed for sliding movement. Also, the fluid seal 29 is designed to function as a "roll back" seal to retract the piston 26 within the recess 12a (fight when viewing FIG. 3) when the brake pedal is released.

The disc brake assembly 10 further includes a rotor, indicated generally at 31, which is connected to a wheel (not shown) of the vehicle for rotation therewith. The illustrated rotor 31 is a ventilated rotor, including a pair of opposed discs 31a and 31b which are spaced apart from one another by a plurality of intermediate ribs or posts 31c in a known manner. The rotor 31 extends radially outwardly between the inboard friction pad 23 and the outboard friction pad 25.

When it is desired to actuate the disc brake assembly 10 to slow or stop the rotation of the rotor 3 1 and the vehicle wheel associated therewith, the driver of the vehicle depresses the brake pedal (not shown). In a manner which is well known in the art, the depression of the brake pedal causes pressurized hydraulic fluid to be introduced into the chamber 30. Such pressurized hydraulic fluid urges the piston 26 in the outboard direction (toward the left when viewing FIG. 3) into engagement with the backing plate 22 of the inboard brake shoe 20. As a result, the friction pad 23 of the inboard brake shoe 20 is moved into frictional engagement with the inboard disc 31a of the rotor 31. At the same time, the caliper 11 slides on the pins 15 in the inboard direction (toward the right when viewing FIG. 3) such that the outboard leg 13 thereof moves the friction pad 25 of the outboard brake shoe 21 into frictional engagement with the outboard disc 31b of the rotor 31. As a result, the opposed discs 31a and 31b of the rotor 31 are frictionally engaged by the friction pads 23 and 25. The structure and operation of the disc brake assembly 10 thus far described is conventional in the art.

Figure 4:
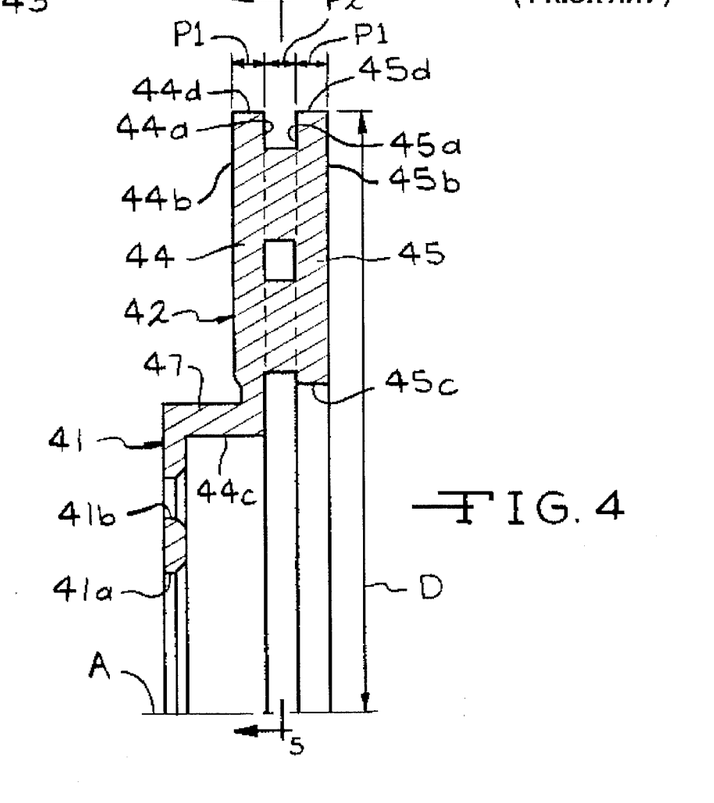
FIG. 4 is a cross sectional View similar to FIG. 3 of a portion an improved structure for a brake rotor adapted for use in the disc brake assembly illustrated in FIG. 1 in accordance with the present invention.
Figure 5:
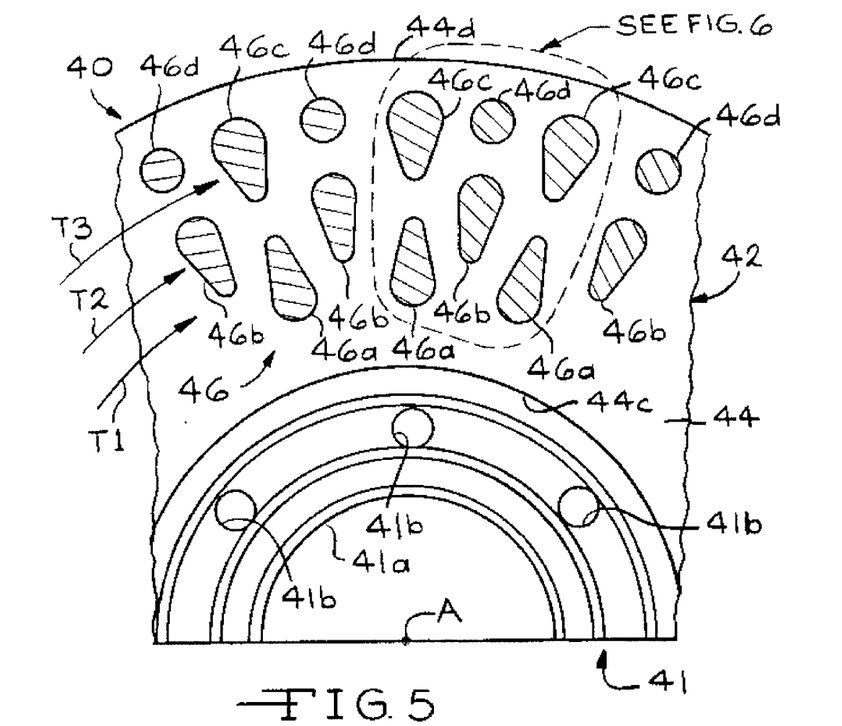
FIG. 5 is a cross sectional view taken along line 5—5 of FIG. 4.
Figure 6:
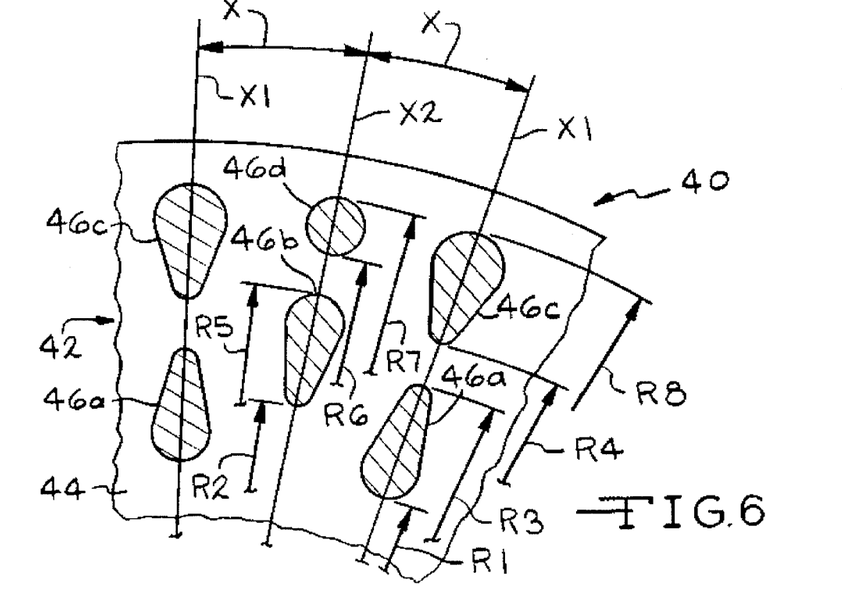
FIG. 6 is an enlarged view of a portion of the brake rotor-illustrated in FIG. 5.

Referring now to FIGS. 4 through 6, there is illustrated an improved structure for a rotor, indicated generally at 40, which can be used in place of the conventional rotor 31 of the prior art disc brake assembly 10 illustrated in FIGS. 1 through 3. Although the rotor 40 of this invention will be described and illustrated in conjunction with the particular prior art vehicle disc brake assembly 10 disclosed herein, it will be appreciated that it may be used in conjunction with other disc brake assembly structures.

The illustrated rotor 40 is a "full cast" rotor and is formed as a one piece casting. The rotor 40 includes an inner mounting flange portion 41 and an outer annular disc portion 42. The inner mounting flange portion 41 and the outer disc portion 42 are preferably cast from gray iron as one piece by a conventional casting process. However, other materials, such as aluminum or aluminum alloys, can also be used. The inner mounting flange portion 41 is formed having a relatively large pilot hole 41 a which is located concentrically about an axis of rotation A for the rotor 40. A plurality of lug bolt receiving holes 41b are also formed through the inner mounting flange portion 41. The lug bolt receiving holes 41b are equally spaced circumferentially about the pilot hole 41a. The pilot hole 41a and the lug bolt receiving holes 41b can be formed by a conventional machining operation after the casting operation is completed. A lug bolt 43 (shown in FIG. 3) extends through each of the lug bolt receiving holes 41b for securing the rotor 40 to a vehicle wheel (not shown) for rotation therewith.

As shown in FIG. 4, the outer disc portion 42 includes a pair of annular friction plates 44 and 45 which are connected together in spaced apart relationship by a plurality of posts, indicated generally at 46 in FIG. 5. The post 46 are located about the circumference of the rotor 40. The specific structure and orientation of the plurality of posts 46 will be described in detail below.

The friction plate 44 is connected by a circumferential wall or hat portion 47 to the inner mounting flange portion 41. The friction plate 44 includes an inwardly facing surface 44a, an outwardly facing surface 44b, an inner peripheral edge 44c, and an outer peripheral edge 44d. Similarly, the friction plate 45 includes an inwardly facing surface 45a, an outwardly facing surface 45b, an inner peripheral edge 45c, and an outer peripheral edge 45d. The inwardly facing surfaces 44a and 45a and the outwardly facing surfaces 44b and 45b of the friction plates 44 and 45, respectively, are located in a generally parallel relationship relative to one another. The outer peripheral edges 44d and 45d of the friction plates 44 and 45, respectively, define an outer rotor diameter D relative to the axis of rotation A.

Referring now to FIGS. 5 and 6, the structures of the posts 46 are illustrated in detail. As shown therein, the posts 46 are arranged in groups of four, namely 46a, 46b, 46c, and 46d. Thus, the four posts 46a, 46b, 46c, and 46d define a single group. A plurality of such groups are formed on the rotor 40 in a pattern which is repeated about the circumference of the rotor 40, as best shown in FIG. 5. Because each of the groups is composed of the same four posts 46a, 46b, 46c, and 46d, a discussion of the structure and orientation of a single one of the groups will clearly describe the structure and orientation of the entire plurality of posts 46.

In the illustrated embodiment, the first post 46a and the third post 46c are radially aligned with one another, and the first post 46a is located radially inwardly of the third post 46c. The first post 46a and the third post 46c are formed symmetrically relative to a bisecting radius X1 which extends outwardly from the axis of rotation A of the rotor 40, as shown in FIG. 6. Similarly, the second post 46b and the fourth post 46d are radially aligned with one another, and the second post 46b is located radially inwardly of the fourth post 46d. The second post 46b and the fourth post 46d are formed symmetrically relative to a bisecting radius X2 which extends outwardly from the axis of rotation A of the rotor 40, as also shown in FIG. 6. The bisecting radii X1 and X2 extend at a predetermined angle X relative to one another. In the illustrated embodiment, the angle X is approximately 9°. As a result, the rotor 40 has twenty groups of the four posts 46a, 46b, 46c, and 46d formed about the circumference thereof. However, the angle X may be varied as desired to provide a greater or lesser number of such groups.

Both the first post 46a and the third post 46c are formed having tear-drop cross sectional shapes. In other words, the first and third posts 46a and 46c have a cross sectional shapes which are somewhat elliptical, extending from first ends defined by a relatively small radius of curvature to second ends defined by a relatively large radius of curvature. The larger radius of curvature end of the first post 46a is located radially inwardly from the smaller radius of curvature end thereof. Conversely, the smaller radius of curvature end of the third post 46c is located radially inwardly from the larger radius of curvature end thereof. The second post 46b and the fourth post 46d are also radially aligned with one another, and the second post 46b is located radially inwardly of the fourth post 46d. The second post 46b is formed having tear-drop cross sectional shape, while the fourth post 46d is formed having a circular cross sectional shape. The smaller radius of curvature end of the second post 46b is located radially inwardly from the larger radius of curvature end thereof.

As best shown FIG. 6, the radially innermost end of the second post 46b is located between the radially innermost end and the radially outermost end of the first post 46a. Similarly, the radially outermost end of the second post 46b is located between the radially innermost end and the radially outermost end of the third post 46c. Thus, the post 46a defines a first circumferentially extending tier identified as T1 in FIG. 5, the post 46b defines a second circumferentially extending tier identified as T2 in FIG. 5, and the post 46c defines a third circumferentially extending tier identified as T3 in FIG. 5. The posts 46d are oriented along the third tier T3.

As shown in FIG. 6, the first posts 46a of the radially innermost tier T1 extend from a radial distance R1 to a radial distance R3. The second posts 46b of the radially intermediate tier T2 extend from a radial distance R2 to a radial distance R5. The third posts 46c of the radially outermost tier T3 extend from a radial distance R4 to a radial distance R8. Lastly, the fourth posts 46d of the radially outermost tier T3 extend from a radial distance R6 to a radial distance R7. In the illustrated embodiment, the radial distances R1 to R8 increase sequentially from R1 to R8, although such is not required. Also, in the illustrated embodiment, the first and second posts 46a and 46b are generally of the same shape and size, although they are oriented in opposite directions. The third posts 46c, on the other hand, are somewhat larger in area than the first and second posts 46a and 46b.

Referring back to FIG. 4, it can be seen that each of the friction plates 44 and 45 defines a first axial thickness P 1. The posts 46a, 46b, 46c, and 46d, on the other hand, define a second axial thickness P2. It has been found to be desirable to form the rotor 40 such that the axial thickness P2 defined by the posts 46a, 46b, 46c, and 46d is greater than the axial thickness P1 defined by the friction plates 44 and 45.

While the rotor 40 of the present invention has been illustrated and described as being a full cast rotor, the invention may be used in connection with other types of rotors. For example, the :invention may be used in connection with a "uni-cast" rotor (not shown), wherein the rotor includes an integral hub portion, or in connection with a "composite" rotor (not shown), wherein the rotor includes a stamped hat portion and a cast outer disc portion. Also, while the rotor 40 of the present invention has been illustrated and described in connection with a "sliding" caliper type of disc brake assembly, the invention may be used with other disc brake assemblies. For example, the invention may be used in connection with a "fixed" caliper type of disc brake assembly (not shown).

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A brake rotor adapted for use in a disc brake assembly comprising:

first and second friction plates defining an axis of rotation; and a plurality of posts extending between said first and second friction plates, said plurality of posts including a first post and a second post which are radially aligned with one another and are formed symmetrically relative to a first bisecting radius extending from said axis of rotation, said plurality of post further including a third post and a fourth post which are radially aligned with one another and are formed symmetrically relative to a second bisecting radius extending from said axis of rotation, said first and second bisecting radii extending at an angle relative to one another, said third post radially overlapping portions of said first post and said second post.

2. The brake rotor defined in claim 1 wherein said first post extends radially outwardly from said rotational axis a predetermined radial distance R1 to a predetermined radial distance R3, said second post extends radially outwardly from said rotational axis a predetermined radial distance R4 to a predetermined radially distance R8, said third post extends radially outwardly from said rotational axis a predetermined radial distance R2 to a predetermined radial distance R5, and said fourth post extends radially outwardly from said rotational axis a predetermined radial distance R6 to a predetermined radial distance R7, wherein said predetermined radial distance R4 of said second post is greater than said predetermined radial distance R3 of said first post, said predetermined radial distance R6 of said fourth post is greater than said predetermined radial distance R4 of said second post, said predetermined radial distance R2 of said third post is greater than said predetermined radial distance R1 of said first post and less than said predetermined radial distance R3 of said first post, and said predetermined radial distance R5 of said third post is greater than said predetermined radial distance R4 of said second post and less than said predetermined radial distance R6 of said fourth post.

3. The brake rotor defined in claim 2 wherein said predetermined radial distance R7 of said fourth post is less than said predetermined radial distance R8 of said second post.

4. The brake rotor defined in claim 1 wherein said first post, said second post, and said third post are each formed having a generally tear-drop cross sectional shape, and said fourth post is formed having a generally circular cross sectional shape.

5. The brake rotor defined in claim 4 wherein said first post extends from a first end defined by a relatively large first radius of curvature to a second end defined by a relatively small second radius of curvature, said first end of said first post located radially inwardly from said second end thereof, said second post extends from a third end defined by a relatively small third radius of curvature to a fourth end defined by a relatively large fourth radius of curvature, said third end of said second post located radially inwardly from said fourth end thereof, said third post extends from a fifth end defined by a relatively small fifth radius of curvature to a sixth end defined by a relatively large sixth radius of curvature, said fifth end of said third post located radially inwardly from said sixth end thereof, and said fourth post is located radially outwardly from said sixth end of said third post.

6. The brake rotor defined in claim 5 wherein said fifth end of said third post is located between said first and second ends of said first post, and said sixth end of said third post is located between said third and fourth ends of said second post.

7. The brake rotor defined in claim 5 wherein said first radius of curvature of said first post and said sixth radius of curvature of said third post are the same, and said second radius of curvature of said first post and said fifth radius of curvature of said third post are the same.

8. The brake rotor defined in claim 7 wherein said third radius of curvature of said second post is greater than said second radius of curvature of said first post and less than said first radius of curvature of said first post, and said fourth radius of curvature of said second post is greater than said first radius of curvature of said first post.

9. The brake rotor defined in claim 1 wherein said predetermined angle is approximately 9°, and said plurality of posts includes 20 groups of four posts.

10. The brake rotor defined in claim 1 wherein each of said friction plates defines a first thickness P1, and said first post, said second post, said third post, and said fourth post define a second thickness P2 which is greater than said first thickness P1.

11. A brake rotor adapted for use in a disc brake assembly comprising:

an inner annular mounting flange portion defining a rotational axis of the rotor; and an outer annular disc portion extending from said inner mounting flange portion and including a pair of friction plates which are connected together by a plurality of posts located about a circumference of the rotor, said plurality of posts divided into a plurality of groups of only four posts which define a single common pattern which is repeated about the circumference of the rotor, said groups of four posts including a first post and a second post radially aligned with one another with respect to a first common bisecting radius which extends radially outwardly from said rotational axis, and a third post and a fourth post radially aligned with one another with respect to a second common bisecting radius which extends radially outwardly from said rotational axis, said first common bisecting radius and said second common bisecting radius extending at a predetermined angle relative to one another said third post radially overlapping portions of said first post and said second post.

12. The brake rotor defined in claim 11 wherein said first post extends radially outwardly from said rotational axis a predetermined radial distance R1 to a predetermined radial distance R3, said second post extends radially outwardly from said rotational axis a predetermined radial distance R4 to a predetermined radial distance R8, said third post extends radially outwardly from said rotational axis a predetermined radial distance R2 to a predetermined radial distance R5, and said fourth post extends radially outwardly from said rotational axis a predetermined radial distance R6 to a predetermined radial distance R7, whereto said predetermined radial distance R4 of said second post is greater than said predetermined radial distance R3 of said first post, said predetermined radial distance R6 of said fourth post is greater than said predetermined radial distance R4 of said second post, said predetermined radial distance R2 of said third post is greater than said predetermined radial distance R1 of said first post and less than said predetermined radial distance R3 of said first post, and said predetermined radial distance R5 of said third post is greater than said predetermined radial distance R4 of said second post and less than said predetermined radial distance R6 of said fourth post.

13. The brake rotor defined in claim 12 wherein said predetermined radial distance R7 of said fourth post is less than said predetermined radial distance R8 of said second post.

14. The brake rotor defined in claim 11 wherein said first post, said second post, and said third post are each formed having a generally tear-drop cross sectional shape, and said fourth post is formed having a generally circular cross sectional shape.

15. The brake rotor defined in claim 14 wherein said first post extends from a first end defined by a relatively large first radius of curvature to a second end defined by a relatively small second radius of curvature, said first end of said first post located radially inwardly from said second end thereof, said second post extends from a third end defined by a relatively small third radius of curvature to a fourth end defined by a relatively large fourth radius of curvature, said third end of said second post located radially inwardly from said fourth end thereof, said third post extends from a fifth end defined by a relatively small fifth radius of curvature to a sixth end defined by a relatively large sixth radius of curvature, said fifth end of said third post located radially inwardly from said sixth end thereof, and said fourth post is located radially outwardly from said sixth end of said third post.

16. The brake rotor defined in claim 15 wherein said fifth end of said third post is located between said first and second ends of said first post, and said sixth end of said third post is located between said third and fourth ends of said second post.

17. The brake rotor defined in claim 15 wherein said first radius of curvature of said first post and said sixth radius of curvature of said third post are the same, and said second radius of curvature of said first post and said fifth radius of curvature of said third post are the same.

18. The brake rotor defined in claim 17 wherein said third radius of curvature of said second post is greater than said second radius of curvature of said first post and less than said first radius of curvature of said first post, and said fourth radius of curvature of said second post is greater than said first radius of curvature of said first post.

19. The brake rotor defined in claim 11 wherein said predetermined angle is approximately 9° and said plurality of posts includes 20 groups of four posts.

20. The brake rotor defined in claim 11 wherein each of said friction plates defines a first thickness P1, and said first post, said second post, said third post, and said fourth post define a second thickness P2 which is greater than said first thickness P1.

21. A brake rotor adapted for use in a disc brake assembly comprising:
    an inner annular mounting flange portion defining a rotational axis of the rotor; and
    an outer annular disc portion extending from said inner mounting flange portion and including a pair of friction plates which are connected together by a plurality of posts located about a circumference of the rotor, said plurality of posts divided into a plurality of groups of four posts, said groups of four posts including a first post and a second post radially aligned with one another with respect to a first common bisecting radius which extends radially outwardly from said rotational axis, and a third post and a fourth post radially aligned with one another with respect to a second common bisecting radius which extends radially outwardly from said rotational axis, said first common bisecting radius and said second common bisecting radius extending at a predetermined angle relative to one another;
    wherein said first post extends radially outwardly from said rotational axis a predetermined radial distance R1 to a predetermined radial distance R3, said second post extends radially outwardly from said rotational axis a predetermined radial distance R4 to a predetermined radial distance R8, said third post extends radially outwardly from said rotational axis a predetermined radial distance R2 to a predetermined radial distance R5, and said fourth post extends radially outwardly from said rotational axis a predetermined radial distance R6 to a predetermined radial distance R7, wherein said predetermined radial distance R4 of said second post is greater than said predetermined radial distance R3 of said first post, said predetermined radial distance R6 of said fourth post is greater than said predetermined radial distance R4 of said second post, said predetermined radial distance R2 of said third post is greater than said predetermined radial distance R1 of said first post and less than said predetermined radial distance R3 of said first post, and said predetermined radial distance R5 of said third post is greater than said predetermined radial distance R4 of said second post and less than said predetermined radial distance R6 of said fourth post.

22. The brake rotor defined in claim 21 wherein said predetermined radial distance R7 of said fourth post is less than said predetermined radial distance R8 of said second post.

23. The brake rotor defined in claim 21 wherein said first post, said second post, and said third post are each formed having a generally tear-drop cross sectional shape, and said fourth post is formed having a generally circular cross sectional shape.

24. The brake rotor defined in claim 23 wherein said first post extends from a first end defined by a relatively large first radius of curvature to a second end defined by a relatively small second radius of curvature, said first end of said first post located radially inwardly from said second end thereof, said second post extends from a third end defined by a relatively small third radius of curvature to a fourth end defined by a relatively large fourth radius of curvature, said third end of said second post located radially inwardly from said fourth end thereof, said third post extends from a fifth end defined by a relatively small fifth radius of curvature to a sixth end defined by a relatively large sixth radius of curvature, said fifth end of said third post located radially inwardly from said sixth end thereof, and said fourth post is located radially outwardly from said sixth end of said third post.

25. The brake rotor defined in claim 24 wherein said fifth end of said third post is located between said first and second ends of said first post, and said sixth end of said third post is located between said third and fourth ends of said second post.

26. The brake rotor defined in claim 24 wherein said first radius of curvature of said first post and said sixth radius of curvature of said third post are the same, and said second radius of curvature of said first post and said fifth radius of curvature of said third post are the same.

27. The brake rotor defined in claim 26 wherein said third radius of curvature of said second post is greater than said second radius of curvature of said first post and less than said first radius of curvature of said first post, and said fourth radius of curvature of said second post is greater than said first radius of curvature of said first post.

28. The brake rotor defined in claim 21 wherein said predetermined angle is approximately 9°, and said plurality of posts includes 20 groups of four posts.

29. The brake rotor defined in claim 21 wherein each of said friction plates defines a first thickness P1, and said first post, said second post, said third post, and said fourth post define a second thickness P2 which is greater than said first thickness P1.

30. A disc brake assembly comprising:
    a caliper provided with at least one cylindrical recess formed therein;
    a piston slidably disposed in said recess;
    a rotor including an inner annular mounting flange portion defining a rotational axis of the rotor and an outer annular disc portion extending from said inner mounting flange portion and including a pair of friction plates which are connected together by a plurality of posts located about a circumference of the rotor, said plurality of posts divided into a plurality of groups of four posts, said groups of four posts including a first post and a second post radially aligned with one another with respect to a first common bisecting radius which extends radially outwardly from said rotational axis, and a third post and a fourth post radially aligned with one another with respect to a second common bisecting radius which extends radially outwardly from said rotational axis, said first common bisecting radius and said second common bisecting radius extending at a predetermined angle relative to one another;
    a pair of brake shoes carried by the disc brake assembly and disposed on opposite sides of said friction plates of said rotor, each of said brake shoes including a backing plate and a friction pad; and actuation means carried by said caliper for selectively moving said brake shoes between a non-braking position, wherein each of said friction pads is spaced apart from the adjacent side of said friction plates of said rotor, and a braking position, wherein said each of said friction pads frictionally engages the adjacent side of said friction plates of said rotor;

wherein said first post extends radially outwardly from said rotational axis a predetermined radial distance R1 to a predetermined radial distance R3, said second post extends radially outwardly from said rotational axis a predetermined radial distance R4 to a predetermined radial distance R8, said third post extends radially outwardly from said rotational axis a predetermined radial distance R2 to a predetermined radial distance R5, and said fourth post extends radially outwardly from said rotational axis a predetermined radial distance R6 to a predetermined radial distance R7, wherein said predetermined radial distance R4 of said second post is greater than said predetermined radial distance R3 of said first post, said predetermined radial distance R6 of said fourth post is greater than said predetermined radial distance R4 of said second post, said predetermined radial distance R2 of said third post is greater than said predetermined radial distance R1 of said first post and less than said predetermined radial distance R3 of said first post, and said predetermined radial distance R5 of said third post is greater than said predetermined radial distance R4 of said second post and less than said predetermined radial distance R6 of said fourth post.

31. The disc brake assembly defined in claim 30 wherein said predetermined radial distance R7 of said fourth post is less than said predetermined radial distance R8 of said second post.

32. The disc brake assembly defined in claim 30 wherein said first post, said second post, and said third post are each formed having a generally tear-drop cross sectional shape, and said fourth post is formed having a generally circular cross sectional shape.

33. The disc brake assembly defined in claim 32 wherein said first post extends from a first end defined by a relatively large first radius of curvature to a second end defined by a relatively small second radius of curvature, said first end of said first post located radially inwardly from said second end thereof, said second post extends from a third end defined by a relatively small third radius of curvature to a fourth end defined by a relatively large fourth radius of curvature, said third end of said second post located radially inwardly from said fourth end thereof, said third post extends from a fifth end defined by a relatively small fifth radius of curvature to a sixth end defined by a relatively large sixth radius of curvature, said fifth end of said third post located radially inwardly from said sixth end thereof, and said fourth post is located radially outwardly from said sixth end of said third post.

34. The disc brake assembly defined in claim 33 wherein said fifth end of said third post is located between said first and second ends of said first post, and said sixth end of said third post is located between said third and fourth ends of said second post.

35. The disc brake assembly defined in claim 33 wherein said first radius of curvature of said first post and said sixth radius of curvature of said third post are the same, and said second radius of curvature of said first post and said fifth radius of curvature of said third post are the same.

36. The disc brake assembly defined in claim 35 wherein said third radius of curvature of said second post is greater than said second radius of curvature of said first post and less than said first radius of curvature of said first post, and said fourth radius of curvature of said second post is greater than said first radius of curvature of said first post.

37. The disc brake assembly defined in claim 30 wherein said predetermined angle is approximately 9°, and said plurality of posts includes 20 groups of four posts.

* * * * *

UNITED STATES PATENT AND TRADEMARK OFFICE
CERTIFICATE OF CORRECTION

PATENT NO. : 5,542,503
DATED : August 6, 1996
INVENTOR(S) : Michael E. Dunn and Don Varnelis It is certified that error appears in the above-indentified patent and that said Letters Patent is hereby corrected as shown below:

Column 6, line 62, after "predetermined", change "radially" to -- radial --.

Column 8, line 26, after "R7,", change "whereto" to -- wherein --.

Signed and Sealed this

Twenty-sixth Day of November 1996

Attest:

BRUCE LEHMAN

*Attesting Officer*      *Commissioner of Patents and Trademarks*